United States Patent [19]
Bunn et al.

[11] Patent Number: 5,372,832
[45] Date of Patent: Dec. 13, 1994

[54] AUTOMATIC BREWER

[75] Inventors: Arthur H. Bunn, Springfield; James H. Anson, Auburn; David F. Ford, Springfield, all of Ill.

[73] Assignee: Bunn-O-Matic Corporation, Springfield, Ill.

[21] Appl. No.: 65,854

[22] Filed: May 21, 1993

Related U.S. Application Data

[60] Division of Ser. No. 818,850, Jan. 10, 1992, Pat. No. 5,255,593, which is a continuation-in-part of Ser. No. 683,285, Apr. 10, 1991, Pat. No. 5,134,925.

[51] Int. Cl.$^5$ ............................................. A23F 5/26
[52] U.S. Cl. .................................... 426/433; 426/231
[58] Field of Search ............................... 426/433, 231

[56] References Cited

U.S. PATENT DOCUMENTS

| 4,633,771 | 1/1987 | Anderl | 99/280 |
| 5,134,925 | 8/1992 | Bunn et al. | 99/289 |
| 5,255,593 | 10/1993 | Bunn et al. | 99/280 |

FOREIGN PATENT DOCUMENTS 2657354 6/1978 Germany.

Primary Examiner—Joseph Golian
Attorney, Agent, or Firm—Trexler, Bushnell, Giangiorgi & Blackstone, Ltd.

[57] ABSTRACT

An automatic beverage brewing apparatus including a brew chamber assembly with a throat in a top portion, a drain in a bottom portion, and a filter positioned therebetween. A movable piston controllably opens and closes the throat and drain during brewing and flushing cycles. A discharge line from the brew chamber has a controllable discharge valve to direct flow from the brew chamber through a dispensing line, a waste line, or to prevent flow though either line. Water may be controllably accumulated in the brew chamber by controlling the discharge valve to prevent flow through either line. At the initiation of the brewing cycle the valve is operated to block the dispensing line and the waste line, whereupon a brewing substance and brewing water are introduced into the brew chamber. The brewing substance floats on and steeps in the brewing water which is accumulated in the brew chamber. A pressurized water line dispenses water into the throat to rinses the throat. After the brewing cycle is complete a flushing cycle begins to thoroughly flush the spent brewing substance from the brew chamber. The discharge valve blocks the discharge line to retain water in the brew chamber to float the spent brewing substance off of the filter. Upon floating the brewing substance the drain is opened to remove the float water and substance.

8 Claims, 5 Drawing Sheets

AUTOMATIC BREWER

CROSS-REFERENCE TO RELATED APPLICATION

This is a division of application Ser. No. 07/818,850 filed Jan. 10, 1992, now U.S. Pat. No. 5,255,593 which in turn is a continuation-in-part of application Ser. No. 07/683,285, filed Apr. 10, 1991, now U.S. Pat. No. 5,134,925.

BACKGROUND AND SUMMARY OF THE INVENTION

This invention relates generally to an improved beverage brewing device which automates many of the steps involved in brewing a beverage.

Automatic brewing devices are known in the art but have not overcome many of the problems associated with such devices. For example, U.S. Pat. No. 4,633,771 to Anderl shows an automatic brewing device which incorporates a movable piston to regulate the brewing cycle. The piston as shown in Anderl is axially moved by a rod which is driven by a motor. The rod advances or retreats based on its engagement with a rotating cam disk. A problem arises with the device of Anderl in that the notches in the cam disc are prone to cause improper brewing if they become coated or clogged with foreign matter. Foreign matter is likely to accumulate on the disc because of the environment in which it operates which includes fines and powder from the beverage brewing substance as well as high humidity from the brewing process.

Another problem with the device as shown in Anderl is that it is difficult to keep the brewing chamber clean and to exhaust spent brewing substance. Anderl shows only a single spray head which proves inefficient and is not thorough ill flushing spent brewing substance from the brew chamber.

Another automatic brewing device is shown in U.S. Pat. No. 4,694,737 to Wittlinger. The device as shown in Wittlinger is similar in its operation to the device in Anderl but does not provide improvements resolving the problems of Anderl. Rather, the device in Wittlinger shows improvements to the filtering assembly as used in the brew chamber.

Another problem with prior automatic brewing devices is that once the brewing substance becomes saturate during the brewing process it sinks to the bottom of the brewing chamber. As the brewed beverage is drained off of the brewing substance the moist brewing substance may become caked on and plug the openings in the filter material. At the end of the brewing cycle the brewing chamber is flushed, typically with a spray of water, in order to remove the spent brewing substance. However, because the brewing substance may be caked on the filter material in the drained brewing chamber the rinse water spray does not completely flush the spent brewing substance out of the brewing chamber. Instead, a portion of the spent substance remains in the brewing chamber on the filter material. The remaining substance inhibits flow of brewed beverage through the filter material and thereby reduces the efficiency of the brewer. Further, depending on the time between brewing cycles, the brewing substance remaining on the filter material may become rancid and degrade the flavor of the next serving of beverage to be brewed.

Additionally, another problem with current automatic brewing devices is that the mechanism for dispensing a brewing substance into the brew chamber is inaccurate. One way to controllably dispense a brewing substance into the brew chamber by means of an auger in a hopper. The auger is positioned in the bottom of a hopper in an operative association with an opening in the hopper through which the brewing substance is moved. However, such auger arrangements are often inaccurate and tend to dispense too much brewing substance.

OBJECTS AND SUMMARY OF THE INVENTION

A general object of the present invention is to provide an improved automatic beverage brewing device which thoroughly and efficiently removes spent beverage brewing substances from a brew chamber at the completion of a brewing cycle.

Another object of the present invention is to provide a brewing substance dispenser in combination with the present invention which dispenses a precise quantity of brewing substance.

Another object of the present invention is to provide an automatic beverage brewing apparatus which rinses a beverage brewing substance from a receiving funnel to assure complete use of the fresh beverage brewing substance and thorough cleaning of the components of the beverage brewing apparatus.

A further object of the present invention is to provide a preliminary floating of the beverage brewing substance prior to brewing.

Another object of the present invention is to provide a beverage brewing apparatus for automatically brewing beverages which generally evenly distributes brew water over a beverage brewing substance to more thoroughly and efficiently extract a brewed beverage therefrom.

Still another object of the present invention is to provide a floating phase of a cleaning cycle to remove the brewing substance from the filter material.

Yet another object of the present invention is to provide a beverage brewing apparatus for automatically brewing beverages which thoroughly removes spent beverage brewing substance from a brew chamber by employing a spray head mounted in a spool member extending through the brew chamber thereby thoroughly removing spent brewing substance from all parts of the brew chamber.

Still a further object of the present invention is to provide a beverage brewing apparatus for automatically brewing beverages which include a rotatable piston and a spray head mounted thereon for rotatably spraying and removing beverage brewing substances from the brew chamber.

Briefly, and in accordance with the foregoing, the present invention comprises an automatic brewing apparatus for automatically brewing beverages such as coffee. The apparatus includes a brewing chamber assembly with a throat in a top portion, a drain in a bottom portion, and a filter positioned therebetween. A movable piston is provided to controllably open and close the throat and drain during brewing and flushing cycles. A separate discharge line directs brewed beverage from the brew chamber to a receiving container. A valve is provided along the discharge line to control the filling of the brewing chamber, to controllably dispense a brewed beverage from the brewing chamber, and to prevent flush water from flowing through a dispensing branch of the discharge line.

At the initiation of the brewing cycle the piston is moved to open the throat to permit the introduction of brewing substance into the chamber. A pressurized water line rinses the throat through which the brewing substance is introduced into the brewing chamber. Additionally, water is introduced through a water distribution manifold to expedite the initial partial filling of the brewing chamber. Water initially introduced into the chamber is used to float the brewing substance permitting saturation and steeping of the brewing substance. The piston is positioned to close the throat during the steeping step. After sufficient steeping time the discharge valve on the discharge line, which is normally deenergized, is energized to open a path through the dispensing branch to direct the flow of brewed beverage into a collection container. The discharge valve is also energized to close the path to the drain sump. After dispensing the brewed beverage, the discharge valve is positioned to close both the dispensing and the drain paths.

After the brewing cycle is complete a flushing cycle begins to flush the spent brewing substance out of the brewing chamber. The valve on the discharge line blocks the discharge line to retain water in the brewing chamber for floating the spent brewing substance in order to float it off of the filter material. Upon floating the brewing substance, the piston is positioned to drain the float water and the spent brewing substance carried thereon. Next, the piston is positioned to close the drain and water is introduced through a spray opening in the piston. The piston is rapidly rotated to spray down the sides of the chamber and to create a swirling motion in the water which has accumulated in the chamber. At a predetermined time the piston is moved to open the drain and flush the swirling water from the chamber while the piston continues to rotate.

The brewing apparatus is programmable to control: the level of prefill water, steeping time, brewing temperature, volume of brew water used, and amount of beverage brewed. The brewing chamber may be pressurized during the brewing process.

The apparatus also includes a brewing substance dispenser which is controlled to dispense a precise predetermined quantity of brewing substance.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements in which.

DETAILED DESCRIPTION OF THE PREFERRED EMBODIMENT

Figure 1:
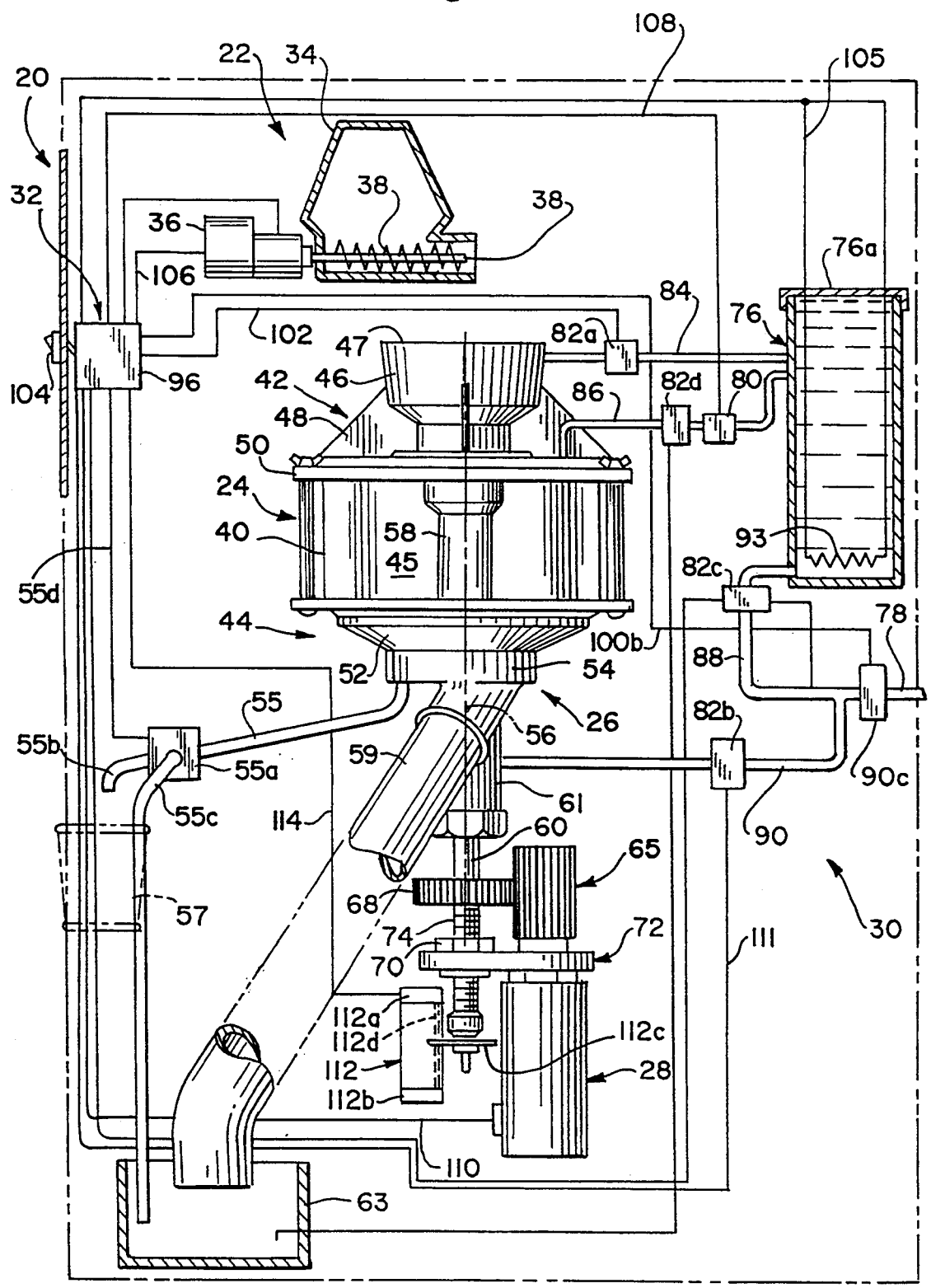
FIG. 1 is a diagrammatic illustration of a beverage brewing apparatus of the present invention.

While the invention may be susceptible to embodiment in different forms, there is shown in the drawings, and will be described in detail, a specific embodiment with the understanding that the present disclosure is to be considered an exemplification of the principles of the invention, and is not intended to limit the invention to that as illustrated and described herein.

Referring now to the drawings, wherein like parts are designated by the same reference numerals throughout the figures, an automatic beverage brewing apparatus or brewer 20 is diagrammatically illustrated in FIG. 1. The brewer 20 includes a hopper assembly 22, a brew chamber assembly. 24, a piston assembly 26 (as better shown in FIGS. 2-5), a drive means or apparatus 28, a water distribution system 30 and a control system 32.

As shown in FIG. 1, the hopper assembly 22 includes a hopper container 34 and a motor 36 driven auger 38 retained therein. A brewing substance such as coffee is disposed inside the hopper container 34 and stored therein for controlled delivery to the brew chamber assembly 24. While the word "coffee" may be used herein with regard to the beverage brewing substance, it should be clear that brewing substances other than coffee may be used in the present invention. Further, although a hopper assembly 22 is shown, a grinding apparatus (not shown) may be added to deliver a predetermined quantity of freshly ground coffee or other beverage brewing substance to the brew chamber assembly 24.

The brew chamber assembly 24 includes a housing member 40 which is retained between a chamber top assembly 42 and a chamber bottom assembly 44. The housing member 40 is a generally cylindrical member formed of a suitable material to withstand the temperature, moisture and other conditions present during the brewing process. As shown herein, the housing member 40 is formed of a suitable transparent material such as glass to permit inspection of the brew chamber assembly 24 without disassembly thereof. As can be seen in FIG. 1, the piston assembly 26 projects upwardly through a drain hole 41, the chamber bottom assembly 44, the housing member 40, and through an inlet throat 43 in the chamber top assembly 42. A brew chamber 45 is defined by the inside surface of the housing member 40 when the top and bottom chamber assemblies 42, 44 are attached thereto.

A funnel portion 46 is mounted on the uppermost portion of the chamber top assembly 42 having top and bottom openings 47a, 47b coaxial with said inlet throat 43 and is reinforced by support members 48 extending from the sides thereof. A spray manifold assembly 50 is positioned between the funnel portion 46 and the housing member 40.

The chamber bottom assembly 44 includes a filter assembly 52 and a drain body 54. With further reference to FIGS. 2-7, the filter assembly 52 helps to separate out a brewed beverage 53 created during the brewing process from water infused brewing substance 53a. A discharge line 55 extends from the filter assembly 52 to a discharge valve 55a which is controllable to direct flow through a dispensing line 55b, through a waste line 55c, or to prevent flow through either line 55b, 55c. The dispensing line 55b delivers a brewed beverage 53 collected from the brew chamber to a container 57. The waste line 55c delivers waste water to the waste sump 63. Spent grounds are transported through an exhaust tube 59 and deposited in the waste sump 63 therebelow.

The discharge valve 55a actually includes a separate solenoid valve for the dispensing line 55b and the waste line 55c. The solenoids in the valve 55a are normally deenergized with the path to the waste line 55c open to allow drainage to the waste sump 63 and the path to the dispensing line 55b closed. The valve 55a is selectively energized to open the dispensing line 55b and close the waste line 55c, or to close both lines 55b, 55c.

As indicated above, the piston assembly 26 projects upwardly through the bottom of the brew chamber assembly 24 along a central axis 56 extending therethrough. Included in the piston assembly 26 is a spool portion 58 generally positioned inside of the housing member 40, and a shank portion 60 attached to and extending downwardly from the spool portion 58.

The drive apparatus 28 includes a lead screw 62 which attaches to the shank portion 60 of the piston assembly 26 to operatively connect the drive apparatus 28 with the piston assembly 26. A motor 64 associated with the drive apparatus 28 moves the gears 65 to rotate and axially displace the lead screw 62 and the attached piston assembly. The motor 64 is preferably a DC motor which may be reversed to reverse the direction of rotation and travel of the piston assembly 26.

While various forms of the gears 65 may be employed to drive the lead screw 62, the driving means 65 as illustrated includes a driving gear 66 engaged with an operating gear 68, both of these gears 66, 68 being cooperatively mating spur gears, and an acme nut 70 attached to a fixed mounting member 72. Fixing the acme nut 70 to the mounting member 72 retains the acme nut 70 in a fixed position relative to the driving gear 66 to produce movement in the lead screw 62. Threads 74 of the lead screw 62 cooperatively engage threads formed on the inside of the acme nut 70. The operating gear 68 is nonrotatably fixed to the lead screw 62 so that when the driving gear 66 is rotated the operating gear 68 is rotated thereby rotating the lead screw 62. As the lead screw 62 is rotated, it threadedly moves through the acme nut 70 resulting in axial displacement of the piston assembly 26 through the brew chamber assembly 24. Further, since the operating gear 68 is fixed to the lead screw 62 the piston assembly 26 also rotates as it is axially displaced through the brew chamber assembly 24.

A heated water reservoir 76 and a cold water inlet line 78 supply water to the water distribution system 30. The heated water reservoir 76 has a sealed top 76a to withstand the incoming water pressure from the inlet line 78. Water flowing from the heated water reservoir 76 and the cold water inlet line 78 are controlled by a respective brew water solenoid valve 80, a rinse water solenoid valve 82a, and a flush water valve 82b. Water flowing into the reservoir 76 through the reservoir fill line 88 is quickly heated as it passes over a heating element 93 which is located near the point where the reservoir fill line enters the reservoir 76.

A pressure switch 90c regulates the line pressure on the inlet line 78 such that water flowing to a reservoir fill line 88 and a flush water line 90 is at a predetermined pressure. Pressure relief valve 82c relieves pressure from the chamber via the cold water line 88. A flow control valve 82d on the brew water line 86 is positioned between the brew chamber 24 and the brew water valve 80 to control the rate of water flow to the brew chamber.

The Brew water valve 80 controls the water flowing from the heated water reservoir 26 which is caused to flow by water being introduced into the reservoir 26 displacing the heated water therein, which displaced water flows through a brew line 86. The brew water line 86 provides brew water to the spray manifold assembly 50 which then evenly distributes the brew water over the beverage brewing substance 53a. The flush water line 90 supplies water to the piston assembly 26 which thereby introduces water into the brew chamber 45 to flush spent beverage brewing substance from the brew chamber 45. The rinse water line 84 emits a controlled amount of pressurized heated water to the funnel portion 46 to rinse any beverage brewing substance 53a from the inside of the funnel 46 and into the brew chamber 24.

The automatic beverage brewer 20 is controlled by the control system 32. The control system 32 includes a central controller 96 which coordinates control signals between it and the components of the brewer 20 over numerous control lines. The control lines are shown diagrammatically as single lines but may include multi-wire lines depending on the requirements of the particular component. The apparatus, as disclosed herein, may be adjusted to brew a range of quantities of brewed beverage and may be adjusted to deliver a larger or smaller quantity of beverage to a carafe or other container, not shown, from which the beverage can be subsequently dispensed. Additionally, the controller 96 is programmable to control: the level of prefill water dispensed into the brewing chamber; the period of time during which infused brewing substance is steeped; brewing water temperature; the volume of brew water used for a predetermined quantity of brewing substance and the volume of brewed substance dispensed through dispensing line.

The hopper assembly 22 includes the hopper motor 36 which is controlled by the controller 96 over the line 106, a hopper container 34, and the auger 38 which extends through the hopper container 34 and is driven by the motor 36. The hopper motor 36 is controlled by a triac and a microprocessor (not shown) of known construction. The microprocessor turns the triac on and off to control the hopper motor 36. The microprocessor applies 120 VAC to the motor 36 when the motor 36 is to operate to drive the auger 38 to deliver a quantity of brewing substance to the brew chamber 24. In order to stop the motor 36 the microprocessor determines when the waveform across the motor 36 is of one polarity. When the polarity is sensed, the microprocessor turns on the triac only when the AC waveform is of the same polarity. For example the microprocessor senses when the voltage across the motor windings is always + to − and then turns on the triac. Thus, the motor 36 is driven with a direct current and produces a braking action on the motor 36. As the braking action is over very small periods of time, the microprocessor may be set to deliver precise quantities of brewing substances 53a from the hopper container 34 to the brewing chamber 24.

FIG. 1 provides a diagrammatic representation of the hydraulic and electrical organization of the present invention. FIG. 8 provides a schematic diagram of the water flow circuit, including the electrical control lines 108, 102, 111 interconnected between the controller 96 and the control valves 80, 82a, 82b, respectively.

Since the inlet line 78 is constantly open and imposing inflowing water pressure on the reservoir 76, the reservoir is constantly topped-off even when not in use. Such topping off maintains the reservoir 76 in a filled condition and ready to brew upon demand at any time.

The rinse water solenoid valve 82a is controlled over line 102 to control flow through the rinse water line 84 for providing controlled pressurized water flow to the funnel portion 46 to rinse any brewing substance 53a off of the funnel 46. After a quantity of brewing substance 53a is dispensed by the hopper assembly 22, the controller 96 signals the rinse water valve 82a and brew water valve 80 over lines 102, 108, respectively, to open and allow water to flow through the rinse water line 84 and the brew water line 86. The water dispensed from the rinse line 84 by the valve 82a rinses the funnel 46 and then collects in the brew chamber 45 making up part of the water which is used to float the brewing substance before the brewing water is dispensed. The water from the brew water line 86 provides additional water to float the brewing substance. Both sources of water 84, 86 are utilized so as to expedite the step of dispensing float water into the brewing chamber 45. After a predetermined period of time the controller 96 signals the rinse water and brew water valves 82a, 80 to close thereby terminating the flow of water into the brew chamber 45.

Since the controller may be programmed for a steep time, there may be a period of time between dispensing the float water and dispensing additional brew water. At the appropriate time, for example after the preset steep time, the controller 96 signals the brew water valve 80 over line 108 to open and allow water to flow through the brew line 84. Water flows through the inlet line 78 simultaneous therewith to introduce non-heated water into the bottom of the reservoir 76 thereby displacing the heated water in the reservoir 76 upwardly an out through the brew line 86. With the brew water valve 80 opened, water flows through the brew line 86 an into the brewing chamber 45 for infusion with the brewing substance. At the end of the brew water dispensing cycle the controller 96 signals the brew water valve 80 to close thereby ceasing the flow of brew water into the brewing chamber 45.

As further shown in FIG. 8, a pressure switch 90a is provided on the inlet line 78 and is connected with the controller 96 via line 100a. The pressure switch 90a may be calibrated to a predetermined pressure setting so that a prespecified minimum pressure level must be developed in the inlet line 78 for the apparatus 20 to operate. Unless the signal transmitted from the pressure switch 90a over line 100a is within the predetermined criteria for operation, the controller 96 will prevent the inlet valve 78a from operating. This pressure switch 90a prevents back pressure and improper brewing.

A flow meter 90b is used to measure the amount of water the apparatus is using during each brewing cycle and is in communication with the controller 96 via line 100c. A primary pressure switch 90c maintains the inlet line 78 at a consistent predetermined pressure level, for example 20 p.s.i. dynamic. The primary pressure switch 90c establishes and assures a consistent working water pressure for the entire hydraulic circuit.

An additional safety mechanism is provided by a pressure switch 90e. The pressure switch 90c also monitors the pressure in the reservoir 76 and will signal to the controller 96 over line 100b to shut off the heating element 93 if the pressure exceeds a predetermined level.

The heated water reservoir 76 also includes the thermostatically controlled heating element 93 which is controlled over control line 105 by a thermostatic device of known construction.

In summary, when operation of the brewer 20 is activated by switch means 104 the controller 96 activates the discharge valve 55a to close the waste line 55c and to activate the motor 36 through control line 106 to measure out a predetermined amount of beverage brewing substance 53a from the hopper assembly 22 into the funnel portion 46. After a predetermined amount of beverage brewing substance 53a has been dispensed into the funnel portion 46, the controller 96 activates the rinse water valve 82a, the brew water valve 80 for a predetermined period of time over control lines 102, 108, respectively, to introduce rinse water through the rinse water line 84 into the funnel portion 46 and to quickly prefill the brewing chamber. At the end of dispensing prefill or float water, the controller 96 may allow the brewing substance to steep for a predetermined period of time. At the end of the steep time, the controller 96 opens the brew water valve 80 to dispense brew water into the brew chamber which results from water flowing through the inlet line and into the heated water reservoir 76 to displace heated water thereby introducing brew water into the brew chamber 45 through the brew line 86.

The drive apparatus 28 is also controlled by the central controller 96 by means of a power control line 110 and an optical sensor 112 (as shown in FIG. 1) associated with the central controller 96 by control line 114. Movement of the components of the drive apparatus 28 are regulated by signals generated by the optical sensor 112. The sensor 112 employs a light transmitter device 112a and a receiver device 112b and a disk 112c. The disk 112c is attached to the end of the lead screw 62 between the transmitter 112a and the receiver 112b. A number of holes (not shown) having predetermined spacing therebetween are formed through the disk 112c to permit the light (as represented by dotted line 112d) from the transmitter 112a to pass therethrough. When light 112d passes through the holes the receiver 112b senses the light 112d, essentially in the form of "on" and "off" signals indicating the number of holes that have passed the beam path, and sends a signal over line 114 to the controller 96. The controller 96 uses the signals from the receiver 112b to control the drive apparatus 28.

The piston assembly 26 includes the spool portion 58 and the shank portion 60. As shown, the spool portion 58 has an enlarged diameter head 122 which terminates in a domed surface 124. A mouth 126 of the funnel 46 tapers down into the throat 43 which is releasably sealed by an axially extending cylindrical side surface 123 of the enlarged diameter head 122 of the spool 58 projecting therethrough against a gasket 130 retained therein. At the bottom end of the brew chamber assembly a drain hole 41 is formed through the filter assembly 52 and communicates with the drain body 54. The drain hole 41 has a diameter less than the diameter of the throat 43 and is releasably sealed by the reduced diameter portion of the spool 58 when the spool 58 of the piston assembly 26 projects therethrough against a gasket 134 retained between the filter assembly 52 and the drain body 54.

Figure 2:
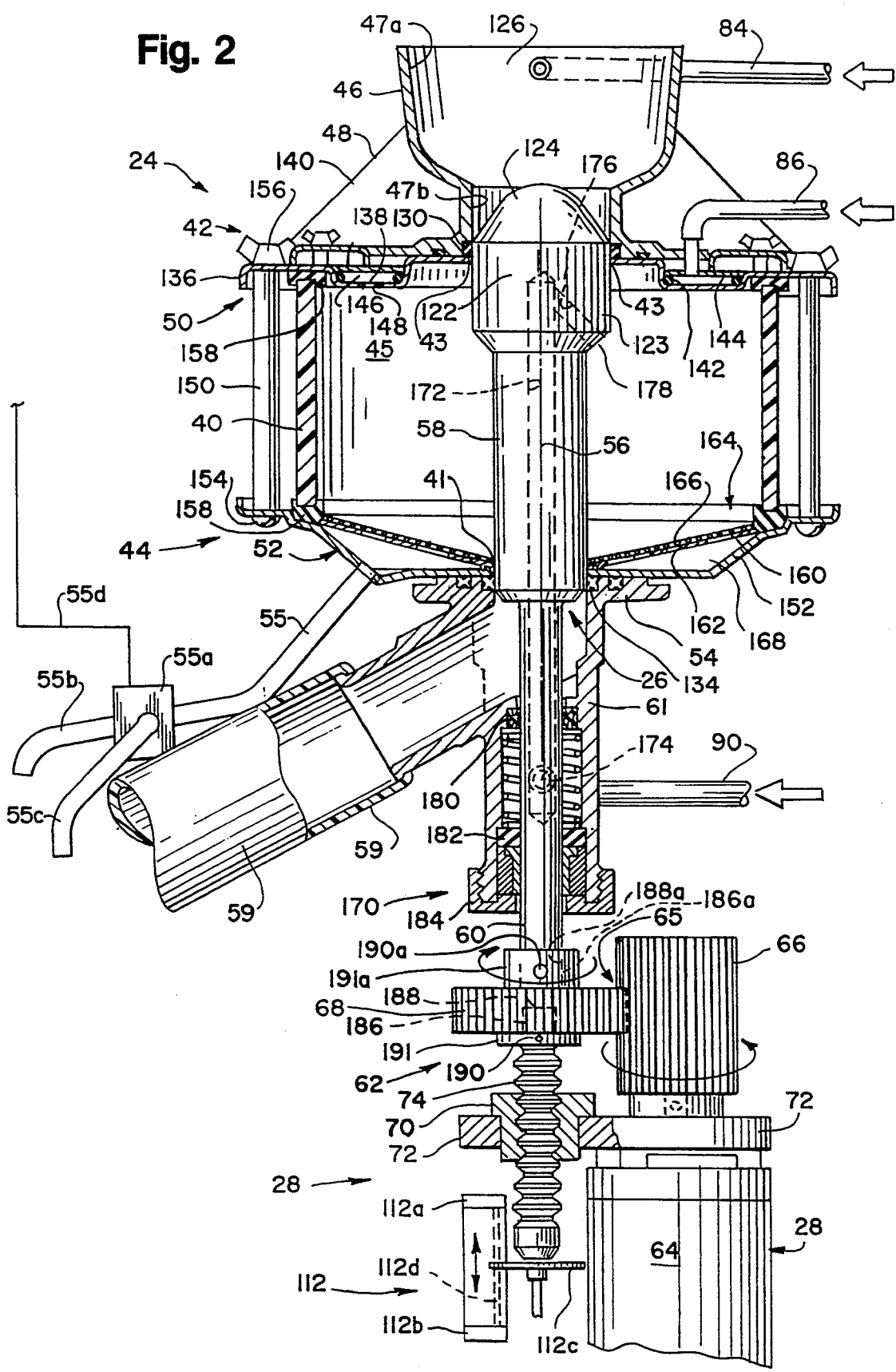
FIG. 2 is a partial fragmentary cross sectional side elevational view of a brew chamber assembly of the beverage brewing apparatus.

As shown in the cross section of FIG. 2, the spray manifold assembly 50 includes a circular manifold plate 136 in which is formed a distribution channel 138 and a channel covering ring 140 which sealably covers the distribution channel 138 with an inside and an outside O-ring 142, 144, respectively. A gap 146 is formed between the channel cover ring 140 and the bottom of the distribution channel 138. The brew line 86 extends through the channel cover ring 140 and communicates with the gap 146 to distribute water throughout the distribution channel 138. Water is distributed over the beverage brewing substance through a series of manifold apertures 148 formed through the distribution channel 138. As will be seen in FIG. 4, water flowing through the manifold apertures 148 is distributed generally evenly over the surface of the beverage brewing substance retained in the brew chamber assembly 24 to maximize the infusion of such substance.

Rod members 150 extend between the manifold plate 136 and a basket member 152 of the filter assembly 52. The rod members 150 have a head 154 at one end and threadedly engage a wingnut 156 at the other end. This arrangement sealably clamps the housing member 40 between the manifold plate 136 and the basket member 152. A seal is effected by sealing members 158 positioned between edges of the housing member 40 and corresponding surfaces of the manifold plate and the basket member 152.

A structural sieve 160 is cooperatively retained in the basket member 152 of the filter assembly 52 for supporting an overlying cover filter material 164. Perforations 162 are formed through the structural sieve 160 to permit fluids to pass therethrough. Pores 166 extending through the filter material 164 permit fluid to pass therethrough and subsequently through the perforations 162 formed through the structural sieve 160. It should be noted that the perforations 162 and the pores 166 shown in FIGS. 2-5 have been exaggerated for illustrative purposes. Fluid which passes through the filter material 164 and the structural sieve 160 collects in a collection space 168 formed between the structural sieve 160 and the basket member 152. Fluid collected therein flows through the dispensing line 55b and into an appropriate collection container 57.

A "Y"-intersection is formed in the drain body between the exhaust tube 59 and the piston housing 61. The downwardly oriented direction of the exhaust tube 59 promotes the flow of spent brewing substance out of the brew chamber 45 during the flushing phase of the brew cycle. The shank portion 60 of the piston assembly passes through a sealed chamber 170 in the piston housing 61. The sealed chamber 170 is sealed at a top end and a bottom end.

The sealed chamber 170 forms a displacable coupling with the flush water line 90 to permit water to flow from the flush water line 90 through a flush water bore 172 formed generally coaxial with the central axis 56 extending through the piston assembly 26. Flush water flowing from the flush water line 90 flows into the sealed chamber 170 and through an inlet aperture 174. Water flows through the flush water bore 172 upwardly towards the enlarged head 122 and is forced through a downwardly directed port 176 formed on an underside of the enlarged head 122 and out through a nozzle 178 attached to the end of the port 176. A top gasket and a bottom gasket 180, 182, respectively, form a seal between the sealed chamber 170 and the shank portion 60 and prevent leaking while the piston assembly 26 is rotated and axially displaced by the drive apparatus 28. A bottom portion of the piston housing 61 is sealed by a cap member 184 threadedly retained thereon.

FIG. 2 provides further detail as to the configuration and operation of the drive apparatus 28. As shown, the lead screw 62 has a male portion 186 which couples with a recess 188 formed in the operating gear 68. A pin 190 projecting through a collar 191 retains the lead screw 62 in engagement with the operating gear 68. Similarly, the shank portion 60 has a male portion 186a which couples with a recess 188a in an opposite side of the operating gear 68. A pin 190a projecting through a collar 191a retains the shank portion 60 in engagement with the operating gear 68. The lead screw 62 threadedly engages the acme nut 70 which is securely retained on the mounting member 72.

Figure 3:
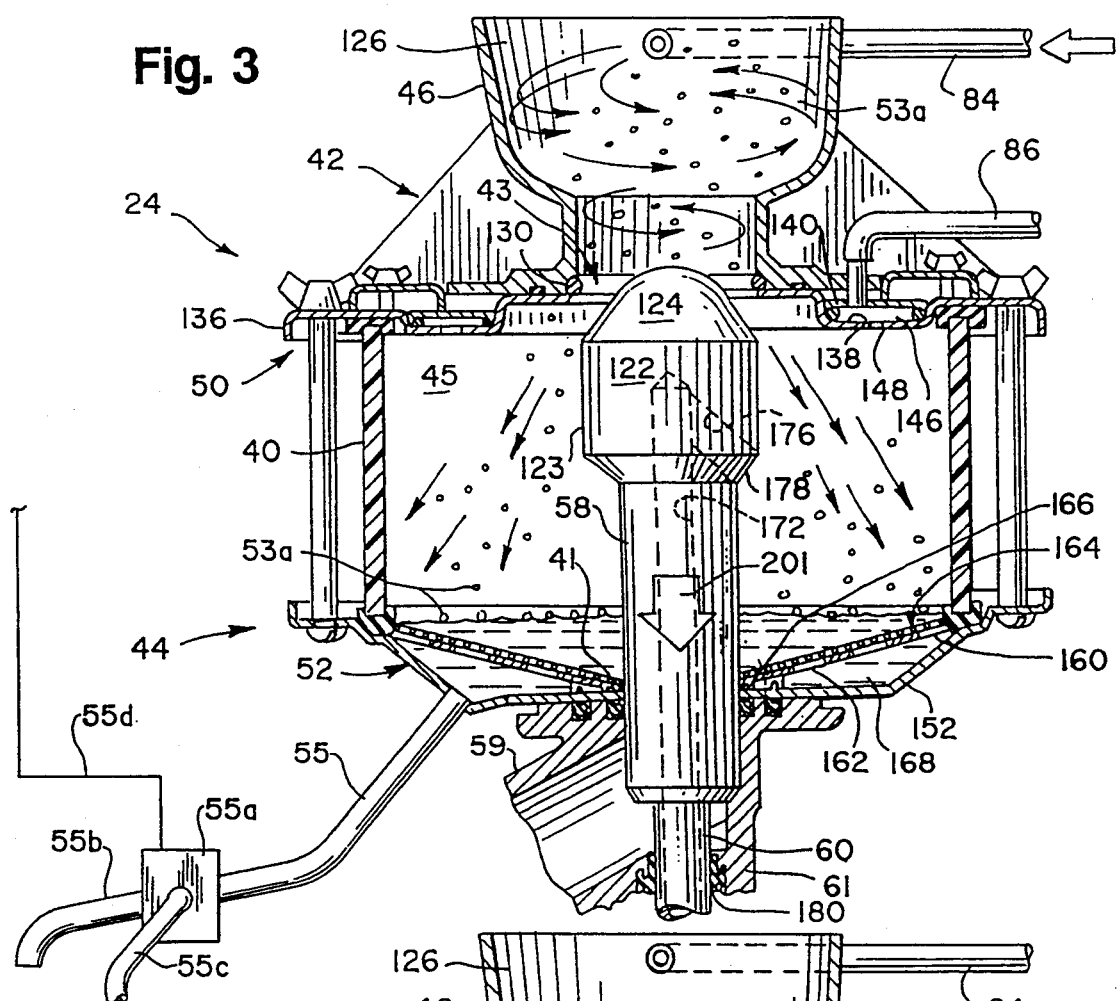
FIG. 3 is a partial fragmentary cross sectional side elevational view of the brew chamber assembly as illustrated in FIG. 2 after a piston assembly projecting therethrough is downwardly axially displaced from an inlet throat and illustrating a beverage brewing substance being disposed therein through a funnel member and preliminary fill water being introduced to rinse the funnel and initially float the brewing substance in the brewing chamber.
Figure 4:
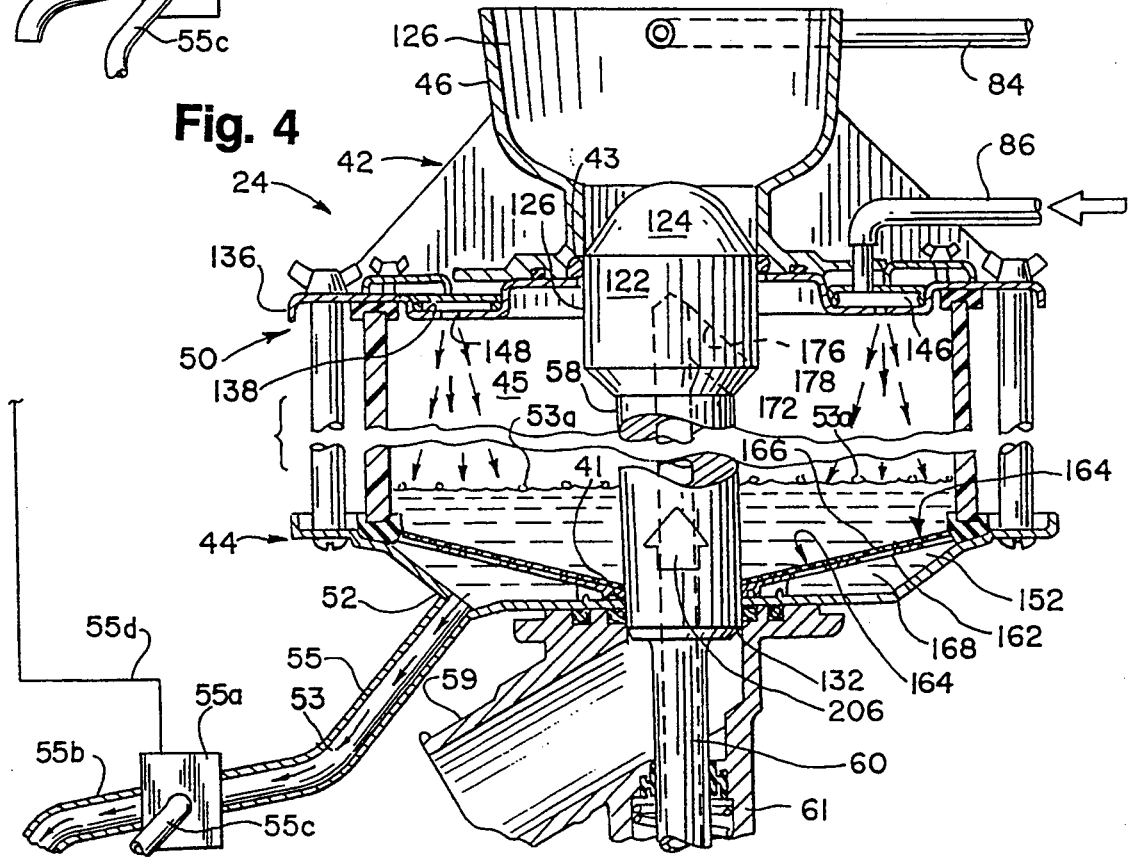
FIG. 4 is a partial fragmentary cross sectional side elevational view of the brew chamber assembly after the piston assembly is upwardly axially displaced to seal the inlet throat and illustrating brew water flowing into the brew chamber for infusing the brewing substance disposed therein.
Figure 5:
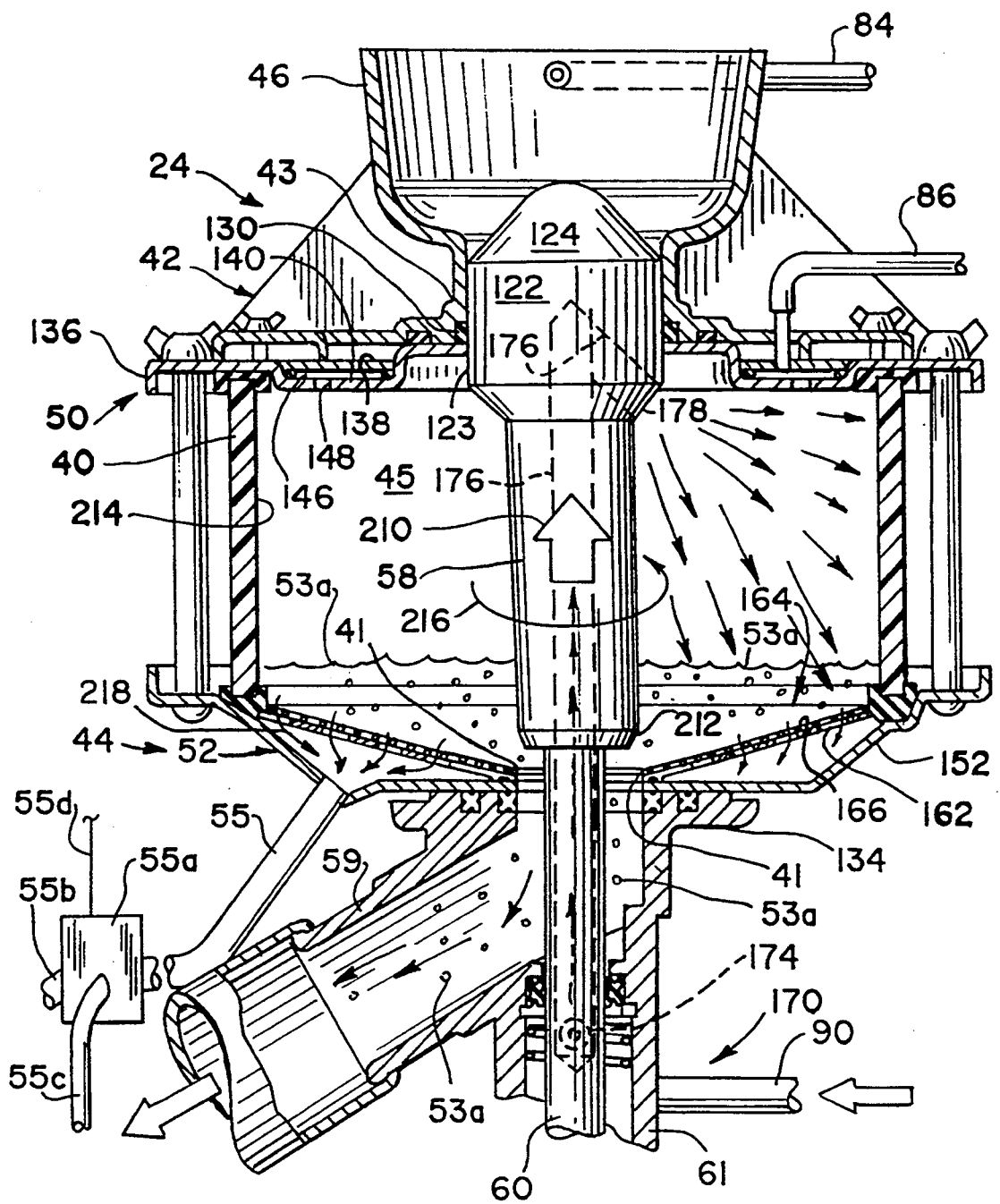
FIG. 5 is a partial fragmentary cross sectional side elevational view of the brew chamber assembly after the piston assembly is upwardly axially displaced and further illustrating rotary movement of the piston assembly spraying the inside of the brew chamber to exhaust spent brewing substance.
Figure 6:
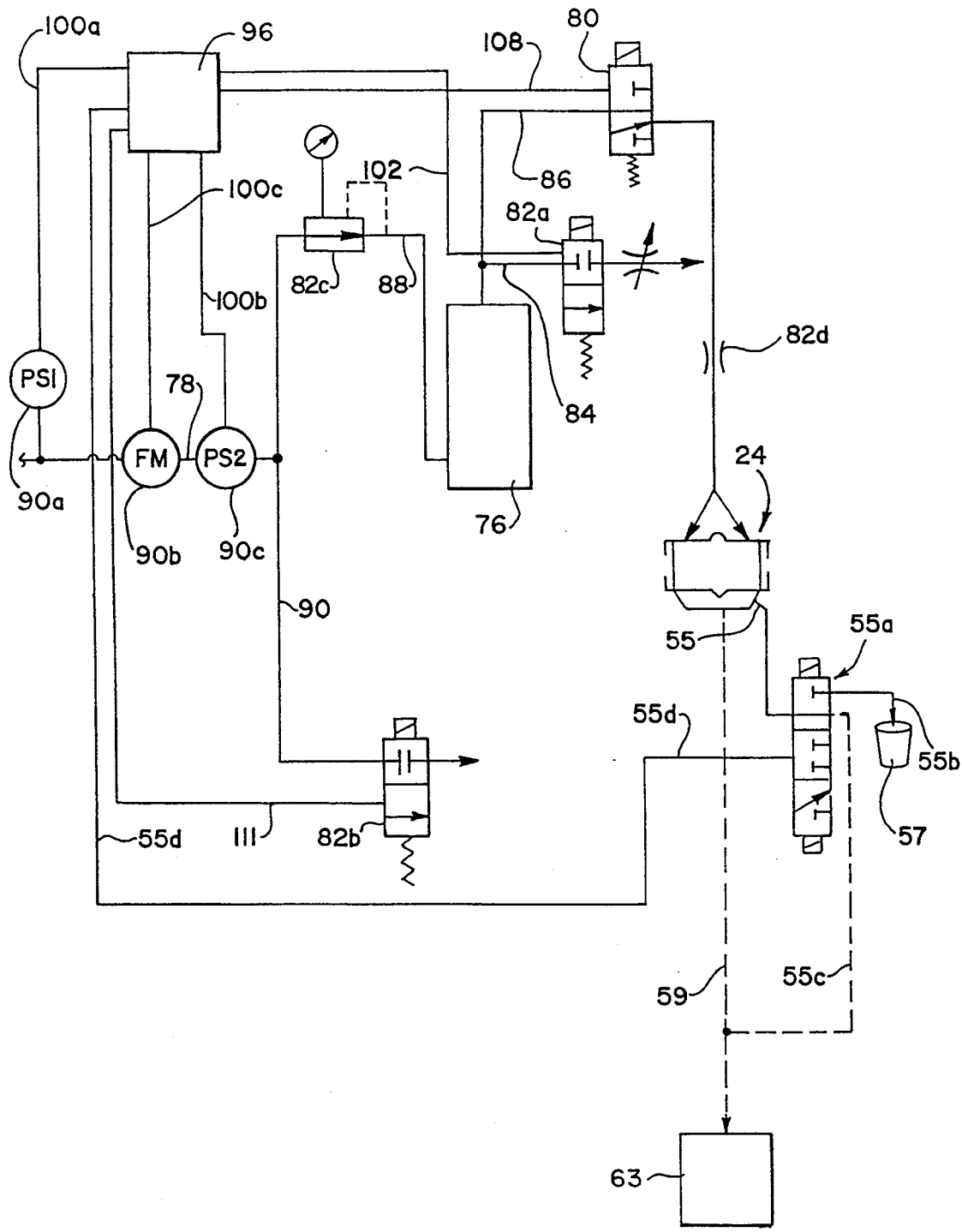
FIG. 6 is a general hydraulic schematic diagram of the the present invention.

Referring now to FIGS. 3-5, the operation of the present invention during the brewing process is discussed. As shown in FIG. 3, upon activation of the brewer 20 at switch 104, the controller 96 signals the motor 64 of the drive apparatus 28 over line 110 to downwardly displace (as indicated by arrow 201) the spool portion 58 to displace the enlarged head portion 122 from the throat 43 to open the throat for receiving a quantity of beverage brewing substance (as indicated by particles 53a) to be disposed into the funnel portion 46 and pass into the brew chamber 45.

The controller 96 next signals the discharge valve 55a over line 55d to close both the dispensing line 55b and the waste line 55c and the rinse water valve 82a over line 102. The controller also signals the brew water valve 80 over line 108 to dispense a predetermined quantity of heated water. Use of both the rinse line 84 and the brew water line 86 expedites the step of dispensing prefill or floating water into the chamber.

The rinse water line 84 will dispense water at a higher pressure than the brew water line 84 since the brew water line 84 pressure is limited by the flow control valve 82d. The higher pressure rinse water acts to flush the particles 53a out of the funnel portion 46 and down through the throat 43 into the brew chamber 45. Further, the rinse water washes particles off of the enlarged head portion 122 and the domed surface 124 thereby providing a better seal between the gasket 130 and the enlarged head portion 122 when the spool 58 is upwardly displaced. The rinse water, brew water, and the beverage brewing substance 53a collect in the filter assembly 52 with the substance 53a floating on the heated water.

As shown in FIG. 4, the spool 58 is moved upwardly (as indicated by arrow 206) to seal the throat 43 formed through the chamber top assembly 42. Note also, that the drain hole 41 formed through the chamber bottom assembly 44 is sealed by the spool portion 58 at this point in the brew cycle. Sealing the brew chamber at the top and bottom prevents the escape of steam during the steeping step and actually pressurizes the chamber to a degree as steam evolves from the steeping brew in the sealed chamber.

Control of the steeping time allows for controlled variable extraction of oils and sediments from the brewing substance providing predetermined brewed beverage results. For example, a smaller quantity of brewing substance which is allowed to steep for a longer period of time may produce the same quantity and intensity of brewed beverage as would a greater quantity of brewing substance which is not allowed to steep.

After a predetermined period of time, or pause, the steeping step is concluded and the brewing process continues. Water is introduced through the inlet line 78 and dispenses water into the heated water reservoir 76 to displace the heated water retained therein once the brew water valve 80 is opened. Water displaced from the heated water reservoir 76 flows through the brew water line 86 and flows through the gap 146 formed between the distribution channel 138 and the channel cover ring 140. Brew water flows through the gap 146 and is dispersed over the beverage brewing substance 53a upon flowing through the plurality of annularly arranged manifold apertures 148 formed through the distribution channel 138. The circle of manifold apertures 148 generally evenly distribute the brew water thereby assuring that all of the beverage brewing substance is thoroughly infused with brewing water to maximize the efficiency of the brewing operation. The discharge valve 55a is selectively controlled to open a path through the dispensing line 55b for a predetermined period of time as set at the controller 96.

Once the beverage brewing substance 53a is infused, a brewed beverage (as indicated by arrows 53) flows through the pores 166 formed through the cover filter material 164 and through the perforations 162 formed through the structural sieve 160. The brewed beverage 53 collects in the collection space 168 and flows into the discharge tube 55 and through the discharge valve 55a, the dispensing line 55b and into the container 57.

After the brewing process is completed, the next step is to flush the brew chamber 45 with water to remove the spent beverage brewing substance 53a therefrom and scrub the brew chamber. As a first step, at the completion of the brewing cycle the controller 96 signals the valve 55a to close both the dispensing line 55b and the waste line thereby preventing flush water from the flush cycle from draining through the discharge tube 55. Next, the spool 58 is raised (as shown in FIG. 5) to open the drain 41 an allow a substantial portion of the slurry of the spent brewing substance and remaining brewing water to flow out through the exhaust tube 59. Shortly before the opening of the drain 41, the controller 96 signals the brew water valve 80 to close and terminate the flow of brewing water therethrough.

Next, the flush water valve 82b which initiates the flow of water through the flush water line 90 and out through the bore 178 formed in the spool 58. The spool 58 is rotated while the flush water is flowing therethrough to quickly rinse the chamber while the spool 58 is in the raised position. Water from this flush step is allowed to drain. The flush water is terminated by closing the flush water valve 82b and the spool 58 is lowered to seal the drain 41 and open the throat 43.

A floating flush step is initiated by introducing water into the chamber by means of the brew water, rinse water, and flush water lines, 84, 86, 90, respectively. Because both paths 55b, 55c through the valve 55a and the drain hole 41 are sealed, the incoming water accumulates in the chamber 45. As a result of the accumulation of water in the chamber 45, the spent brewing substance is floated off of the filter material thereby preventing clogging of the pores in the filter material.

When the flush water valve 82b is opened water flows through the flush waterline 90 into the sealed chamber 170 and up through the flush water bore 172. Water flows from the bore 178 and onto the inside surface 214 of the housing member 40 for rinsing and removing beverage brewing substance 53a and other matter therefrom. Additionally, the spray of water from the bore 178 is directed towards the inside surface 214 which results in driving the floating brewing substance 53a towards the center of the brewing chamber 45 where it flows down the drain hole 41 without clinging to any of the surfaces of the brewing chamber 45. The bore 178 as used in the present invention provides at least a 90° spray angle so that the water flushes the top edge of the inside surface 214 of the housing member 40. Further, because the spool portion 58 rotates (as indicated by arrow 216) about the central axis 56, a single bore 178 may be employed to spray the entire brew chamber 45 during the flushing operation. It should be noted, however, that multiple bores 178 or nozzles may be used to further enhance the flushing operation.

As the spool 58 rotates and emits a spray of flush water, it moves upwardly to a position just before it unseals from the drain 41. In this position the spool 58 begins to rotate at high speed while it continues to emit flush water. Flow from the rinse and brew water lines 84, 86 are terminated. The rapid rotation of the of the spool 58 and the spray of flush water being emitted therefrom induce the accumulated water to swirl within the chamber and agitate any material free from the filter material as well as scrub clean the interior surfaces of the chamber. This dramatic swirling and agitation action continues for a period of approximately 2 or 3 seconds before the spool 58 is finally raised to the point at which it unseals from the drain 41. Once unsealed from the drain 41, the spool 58 continues to rotate for a brief period of time.

The spool 58 is moved upwardly (as indicated by arrow 210) as shown in FIG. 5 for moving the enlarged head portion 122 upwardly through the throat 43 thereby disengaging a lower portion 212 of the spool 58 from the drain hole 41. Once the drain hole 41 is opened, the accumulated water swirling in the chamber under the influence of the rotating spool 58, including the spent brewing substance 53a which was floated or agitated off of the filter material, flows out of the brewing chamber 45 through the drain hole 41.

The beverage brewing substance 53a is flushed through the exhaust tube 59 and into the waste sump 63. 160. Waste water (as indicated by arrows 218 in FIG. 5) which flows through the filter assembly 52 flows into the discharge tube 55. Because it would be highly undesirable to have waste water flowing into the freshly brewed beverage or into the collection container area, the discharge valve 55a is selectively controlled to maintain the path through the dispensing line 55b closed and to open the path through the waste line 55c.

After the spool 58 is moving upward, spool 58 continues to spray flush water for at least another rotation to provide a final rinse of chamber. At the completion of the flushing cycle, the lower portion 212 of the spool portion 58 is sealably seated in the drain hole 41.

The spool 58 is axially displaced as well as rotated during the flushing cycle because of the thread arrangement on the lead screw 62. The lead screw 62 and the acme nut 70 are essentially self cleaning and therefore this arrangement is not susceptible to build up of foreign matter as does the prior art.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A method of automatically brewing a beverage in a machine having a brew chamber and a centrally disposed piston operatively positioned extending therethrough, said method comprising the steps of: introducing a brewing substance into said chamber; introducing a quantity of heated water into the brew chamber for floating the brewing substance; steeping the brewing substance in said water for a predetermined period of time; then introducing additional heated water into said chamber while dispensing brewed beverage from said chamber and subsequently terminating dispensing of brewed beverage and flushing spent brewing substance from said chamber; introducing a second quantity of water into the brew chamber after flushing said brew chamber for floating any remaining spent brewing substance; producing a water spray from said piston for spraying inside surfaces of said brew chamber; rotating said piston to rotate said water spray emitter therefrom to induce a swirling movement in said second quantity of water and said spent brewing substance, flushing said swirling water out of said brew chamber.

2. A method of brewing a beverage according to claim 1, further including oscillating said piston to oscillate said water spray within said brew chamber for agitating the water and floating brewing substance in said brew chamber.

3. A method of brewing a beverage in an automatic beverage brewing apparatus having a brew chamber assembly having an inlet throat and a drain hole and a water distribution system for delivering water to said brew chamber assembly; said brew chamber assembly including a movable piston positioned inside of said brew chamber; discharge means for directing a brewed beverage from said brew chamber assembly to a dispensing point; valve means operatively associated with said discharge means for controlling flow of brewed beverage through said discharge means and retention of water in brew chamber assembly; said method including the following steps:

moving said piston for respectively sealing said drain hole while opening said throat;
operating said valve means to block said discharge means;
introducing a brewing substance into said brew chamber through said throat when said throat is opened;
dispensing a quantity of water into said brew chamber for floating said brewing substance disposed in said brew chamber;
introducing brew water into said brew chamber assembly for infusing said brewing substance floating therein;
operating said valve means to open said discharge means;
dispensing a brewed beverage produced from said infused brewing substance through said discharge means;
operating said valve means to block said discharge means;
introducing a quantity of water into said brew chamber for floating said brewing substance off of said filter means; and
opening said drain opening to drain said brewing substance floating in said brew chamber and the water on which said brewing substance floats.

4. A method of brewing a beverage according to claim 3, further including:

dispensing heated water for rinsing said brewing substance from said throat;
dispensing water directly into said brew chamber simultaneous with dispensing water to rinse said throat for expediting the accumulation of water in said brew chamber for floating said brewing substance; and
terminating dispensing of water after a predetermined period of time.

5. A method of brewing a beverage according to claim 4, further including steeping said brewing substance in the water accumulated in said brew chamber for a predetermined period of time after terminating the of dispensing water into said brew chamber.

6. A method of brewing a beverage according to claim 3, wherein said beverage brewing apparatus further includes a heated brew water line, a heated rinse water line, and a flush water line controllably communicating with said brew chamber assembly; said method further including:

controlling said rinse, brew, and flush lines to simultaneously dispense water into said brew chamber at the beginning of a flush cycle after said brew chamber is drained and said piston is controllably positioned to seal said drain for expediting the accumulation of water in said brew chamber for floating said brewing substance;
rotating said piston and dispensing flush water therethrough for rinsing off the inside surfaces of said brew chamber;
terminating dispensing of water from said rinse, brew, and flush lines after a predetermined period of time; and
opening said drain to exhaust the accumulated water and floating brewing substance from the brew chamber;
moving said piston in a downward direction for inducing movement of the floating brewing substance towards the-drain hole.

7. A method of brewing a beverage according to claim 6, further including the step of:

rotating said piston at high speed and simultaneously dispensing flush water therethrough before opening said drain for inducing a swirling movement of water accumulating in said brew chamber;
maintaining said rotation of said piston for a predetermined period of time after opening said drain for continuing said swirling action while draining said brew chamber to thoroughly clean said brew chamber.

8. A method of brewing a beverage according to claim 3, said beverage brewing apparatus further including a heated brew water line, a heated rinse water line, and a flush water line controllably communicating with said brew chamber assembly; said method further including:

dispensing water into said throat for rinsing brewing substance therefrom;

dispensing water directly into said brew chamber simultaneous with dispensing water to rinse said throat for expediting the accumulation of water in said brew chamber for floating said brewing substance;

terminating dispensing of water from said rinse and brew lines after a predetermined period of time.

controlling said rinse, brew, and flush lines to simultaneously dispense water into said brew chamber at the beginning of a flush cycle after said brew chamber is drained and said piston is controllably positioned to seal said drain for expediting the accumulation of water in said brew chamber for floating said brewing substance;

terminating dispensing of water after a predetermined period of time; and opening said drain to exhaust the accumulated water and floating brewing substance from the brew chamber.

* * * * *